US012172438B2

(12) United States Patent
Byun et al.

(10) Patent No.: US 12,172,438 B2
(45) Date of Patent: Dec. 24, 2024

(54) METHOD FOR ALIGNING A PLURALITY OF NOZZLE TIPS

(71) Applicant: ENJET CO. LTD., Suwon-si (KR)

(72) Inventors: Do Young Byun, Seoul (KR); Vu Dat Nguyen, Suwon-si (KR); Kwangsun Jeon, Suwon-si (KR)

(73) Assignee: ENJET CO. LTD., Suwon-si (KR)

( * ) Notice: Subject to any disclaimer, the term of this patent is extended or adjusted under 35 U.S.C. 154(b) by 0 days.

(21) Appl. No.: 18/521,721

(22) Filed: Nov. 28, 2023

(65) Prior Publication Data

US 2024/0092079 A1 Mar. 21, 2024

Related U.S. Application Data

(62) Division of application No. 17/645,664, filed on Dec. 22, 2021, now abandoned.

(30) Foreign Application Priority Data

Sep. 30, 2021 (KR) ........................ 10-2021-0129626

(51) Int. Cl.

| | |
|---|---|
| ***B41J 2/125*** | (2006.01) |
| ***B41J 2/06*** | (2006.01) |
| ***B41J 2/14*** | (2006.01) |

(52) U.S. Cl.

CPC ................. *B41J 2/125* (2013.01); *B41J 2/06* (2013.01); *B41J 2/14* (2013.01); *B41J 2202/15* (2013.01)

(58) Field of Classification Search

CPC ....... B41J 2/125; B41J 2/06; B41J 2/14; B41J 2202/15; B41J 25/001; B41J 2/04508; B41J 25/304

See application file for complete search history.

(56) References Cited

U.S. PATENT DOCUMENTS 8,903,516 B2 12/2014 Trzcinski et al.
2015/0093498 A1 4/2015 Reid et al.
(Continued)

FOREIGN PATENT DOCUMENTS

CN 103871929 A 6/2014
JP 2018-001164 A 1/2018
(Continued)

OTHER PUBLICATIONS

Office Action in corresponding Taiwanese application No. 11120754180 dated Aug. 1, 2022.
(Continued)

*Primary Examiner* — Jannelle M Lebron
(74) *Attorney, Agent, or Firm* — Saliwanchik, Lloyd & Eisenschenk

(57) ABSTRACT

The present disclosure relates to a method for aligning a plurality of nozzle tips, the method comprising:

a first nozzle aligning step of setting a reference position of a first nozzle tip for discharging ink within a working area through an image of a first camera observing the working area above a substrate and a second camera observing the working area in an inclined direction;

a second nozzle aligning step of setting a reference position of a second nozzle tip for discharging ink within the working area through the image of the first camera and the second camera;

a step of detecting a position of a substrate based on the image of the second camera; and a printing preparation step of positioning the first nozzle tip and the second nozzle tip to a printing position on the substrate.

7 Claims, 7 Drawing Sheets

(56) References Cited

U.S. PATENT DOCUMENTS

| | | | |
|---|---|---|---|
| 2015/0373305 | A1 | 12/2015 | Hauf et al. |
| 2017/0173945 | A1 | 6/2017 | Byun et al. |
| 2019/0291415 | A1 | 9/2019 | Byun et al. |

FOREIGN PATENT DOCUMENTS

| | | | |
|---|---|---|---|
| KR | 20170072748 | A | 6/2017 |
| KR | 10-1979539 | B1 | 5/2019 |
| TW | 201417896 | A | 5/2014 |
| TW | 201609440 | A | 3/2016 |
| WO | 2016036646 | A1 | 3/2016 |

OTHER PUBLICATIONS

Office Action in corresponding Korean application No. 10-2021-0129626 dated Jun. 14, 2023.

METHOD FOR ALIGNING A PLURALITY OF NOZZLE TIPS

CROSS-REFERENCE TO RELATED APPLICATIONS

The present application is a divisional of U.S. application Ser. No. 17/645,664, filed Dec. 22, 2021, which claims priority to Korean Patent Application No. 10-2021-0129626, filed Sep. 30, 2021, the disclosures of each of which are incorporated herein by reference in their entirety.

FIELD

The present disclosure relates to a printing apparatus with a plurality of nozzle heads and method for aligning a plurality of nozzle tips, and more particularly, to a printing apparatus with a plurality of nozzle heads, having a structure where each of the plurality of nozzle heads are independently controlled, thereby improving the printing speed and productivity, and where the plurality of nozzles are configured to share a camera, thereby forming a compact configuration.

BACKGROUND

In general, an ink jet device for jetting fluid in the form of droplets has been mainly applied to inkjet printers in the past, but recently it is being widely applied in high-tech industries such as display manufacturing processes, printed circuit board manufacturing processes, and DNA chip manufacturing processes, etc.

The ink jet device is a device for discharging droplets from ink in a fluid state, and such ink jet devices are largely divided into thermal type ink jet devices and piezoelectric type ink jet devices depending on the method of discharging the droplets. However, recently, for ultra-fine printing, electrostatic jet printers that use the electrodynamic method are widely being used.

An electrostatic jet printer jets ink using the electrostatic force caused by a potential difference generated when a voltage is applied between a nozzle and a substrate. Since the electrostatic jet printer discharges droplets or continuous jets using the force of pulling a liquid surface with the electrostatic force, it is known to have numerous advantages, for example, unlike other conventional method jet printers, it enables nano-scale patterning, it can also discharge high-viscosity ink, and it can generate droplets uniformly.

However, there is a problem in the printing device according to prior art in that it performs the printing process using a single nozzle, which reduces the productivity.

If a plurality of independently driven nozzles are arranged in parallel in order to improve this problem, productivity can be improved, but then, there occurs a problem that not only the manufacturing cost of the device will excessively increase but also the volume of the device will increase.

PRIOR ART LITERATURE

Patent Literature (PATENT LITERATURE 0001) KOREAN LAID-OPEN PATENT NO. 10-2017-0072748

SUMMARY

Therefore, a purpose of the present disclosure is to resolve the problems of prior art, that is, to provide a printing apparatus with a plurality of nozzle heads, having a structure where each of the plurality of nozzle heads are independently controlled, thereby improving the printing speed and productivity, and where the plurality of nozzles are configured to share a camera, thereby forming a compact configuration.

Further, another purpose of the present disclosure is to provide a method for arranging a plurality of nozzle tips, where the shared camera can be used to set a reference position for the plurality of nozzle tips to align the positions, thereby precisely controlling the positions of the plurality of nozzle tips that are driven independently.

The aforementioned purpose is achieved by a printing apparatus with a plurality of nozzle heads, the apparatus including a first nozzle head having a first nozzle tip for discharging ink and a first moving part for moving the first nozzle tip, and disposed at one side of a working area on a substrate; a second nozzle head having a second nozzle tip for discharging ink and a second moving part for moving the second nozzle tip, and disposed at the other side of the working area on the substrate; and a first camera disposed above the substrate to observe both the first nozzle tip and the second nozzle tip.

Here, it is desirable that the printing apparatus further includes a second camera disposed to observe both the first nozzle tip and the second nozzle tip in an inclined direction.

Further, it is desirable that the printing apparatus further includes a controller that controls driving of the first moving part and the second moving part based on an image obtained in the first camera and the second camera, to control each position of the first nozzle tip and the second nozzle tip.

Further, it is desirable that the first nozzle head and the second nozzle head each includes a high voltage application part for applying a voltage to ink in order to discharge the ink in an electrohydrodynamic method.

Further, it is desirable that the first nozzle head and the second nozzle head are disposed to be spaced apart in a first axis direction with respect to the working area, and the second camera is disposed to be spaced apart from the first camera in a second axis direction intersecting the first axis.

Further, it is desirable that the first nozzle tip and the second nozzle tip are disposed to be inclined so as to have an inclination with respect to the first axis.

Further, it is desirable that the second camera is disposed to be inclined so as to have an inclination with respect to the second axis.

Further, it is desirable that the first moving part and the second moving part are configured to enable at least three axis movements.

Another purpose of the present disclosure is achieved by a method for aligning a plurality of nozzle tips, the method including a first nozzle aligning step of setting a reference position of a first nozzle tip for discharging ink within a working area through an image of a first camera observing the working area above a substrate and a second camera observing the working area in an inclined direction; a second nozzle aligning step of setting a reference position of a second nozzle tip for discharging ink within the working area through the image of the first camera and the second camera; a step of detecting a position of a substrate based on the image of the second camera; and a printing preparation step of positioning the first nozzle tip and the second nozzle tip to a printing position on the substrate.

Here, it is desirable that the reference position is set by positioning a distal end of the first nozzle tip or a distal end of the second nozzle tip at a center of a Field of View (FOV) of the first camera, and then by positioning the distal end of the first nozzle tip or the distal end of the second nozzle tip at a center of a FOV of the second camera.

Further, it is desirable that after the first nozzle aligning step and the second nozzle aligning step, a step of moving the first nozzle tip and the second nozzle tip to designated positions is performed, wherein each designated position is spaced apart by a certain distance from the reference position.

Further, it is desirable that the designated positions are set such that the first nozzle tip and the second nozzle tip are spaced apart from each other in a horizontal direction with respect to the reference position so as to inhibit interference of the first nozzle tip and the second nozzle tip.

Further, it is desirable that a third axis direction position of the designated position may be set as a position spaced apart by a predesignated distance from a position of the substrate detected by autofocusing the substrate.

Further, it is desirable that at the step of moving to the designated position, the third axis direction position of the first nozzle tip and the second nozzle tip are adjusted by a driving part that moves the first nozzle tip, the second nozzle tip, the first camera and the second camera at the same time.

Further, it is desirable that at the printing preparation step, the third axis direction position of the first nozzle tip and the second nozzle tip are adjusted by the driving part that moves the first nozzle tip, the second nozzle tip, the first camera and the second camera at the same time.

Further, it is desirable that the step of detecting the position of the substrate detects a height of the substrate using an image of the nozzle tip included in the image obtained through the second camera and the mirroring image of the nozzle tip reflected on the substrate.

According to the present disclosure, there is provided a printing apparatus with a plurality of nozzle heads, having a structure where each of the plurality of nozzle heads are independently controlled, thereby improving the printing speed and productivity, and where the plurality of nozzles share a camera, thereby forming a compact configuration.

Further, there is provided a method for aligning a plurality of nozzle tips, where the shared camera can be used to set a reference position for the plurality of nozzle tips to align the positions, thereby precisely controlling the positions of the plurality of nozzle tips that are driven independently.

DETAILED DESCRIPTION

Figure 1:
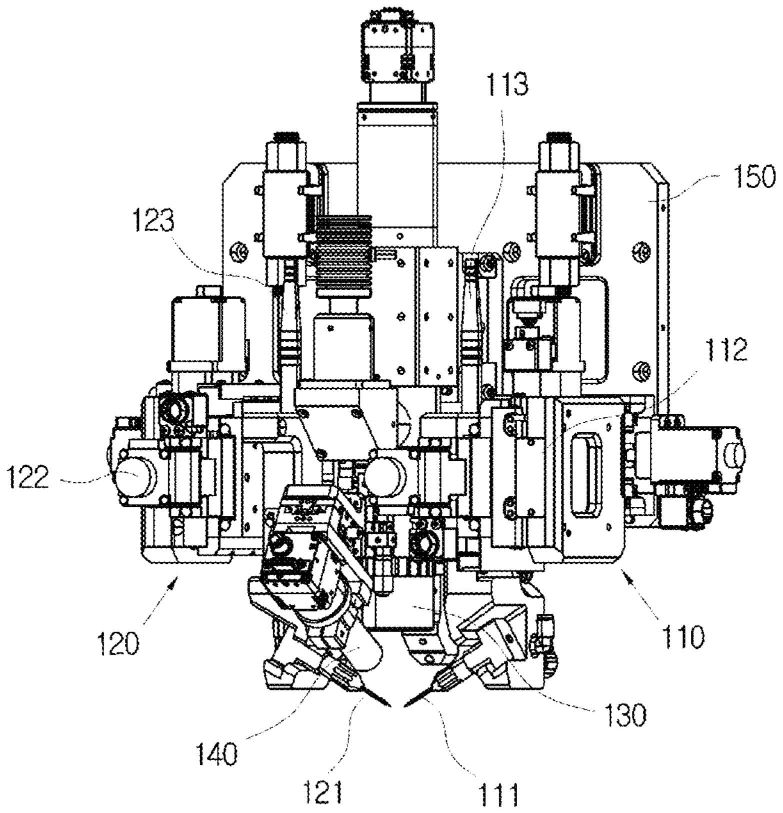
FIG. 1 is a perspective view of a printing apparatus with a plurality of nozzle heads of the present disclosure.

Prior to the description, it is to be noted that in numerous embodiments, components having the same configurations will be typically described in the first embodiment using the same reference numerals, and in rest of the embodiments, only the configurations different from the first embodiment will be described.

Hereinbelow, referring to the attached drawings, a printing apparatus with a plurality of nozzle heads according to one embodiment of the present disclosure will be described in detail.

Figure 2:
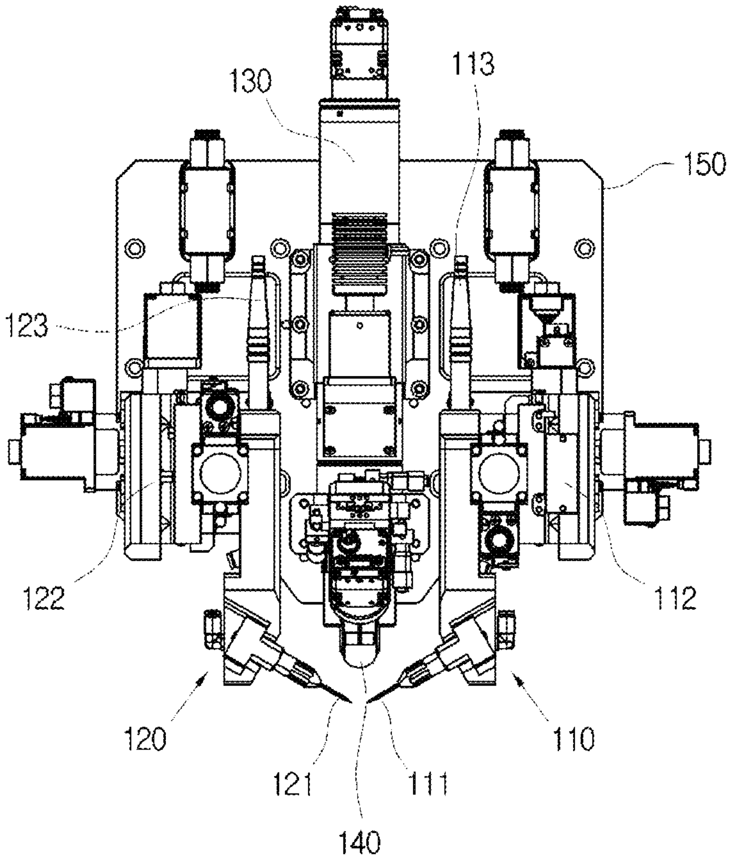
FIG. 2 is a front view of the printing apparatus with a plurality of nozzle heads of the present disclosure.
Figure 3:
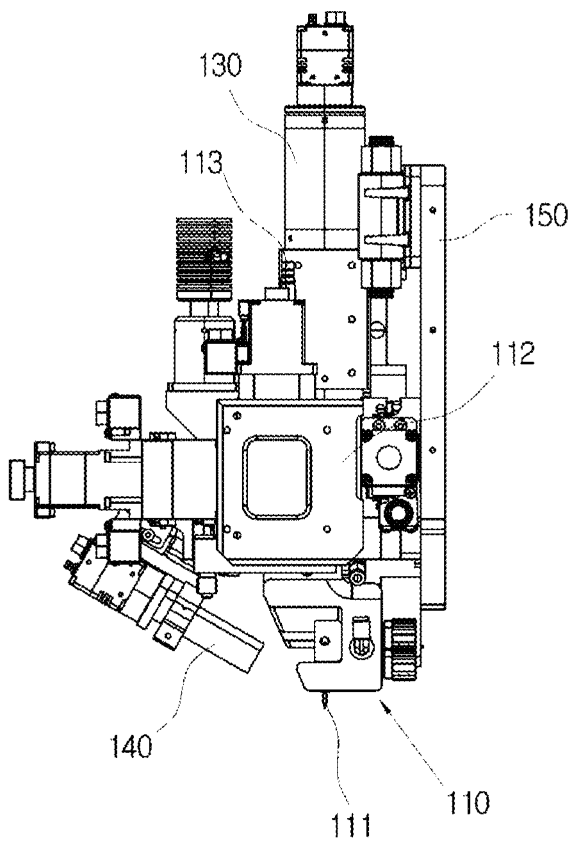
FIG. 3 is a side view of the printing apparatus with a plurality of nozzle heads of the present disclosure.
Figure 4:
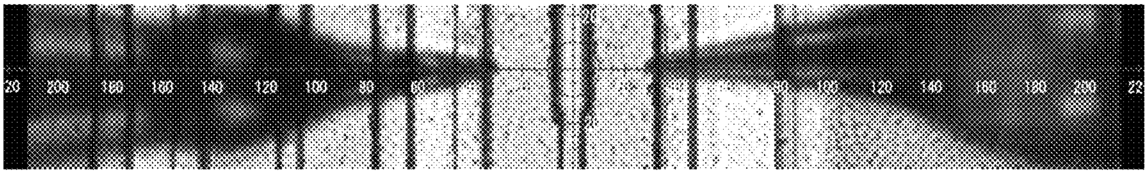
FIG. 4 is an image of a first camera image.
Figure 5:
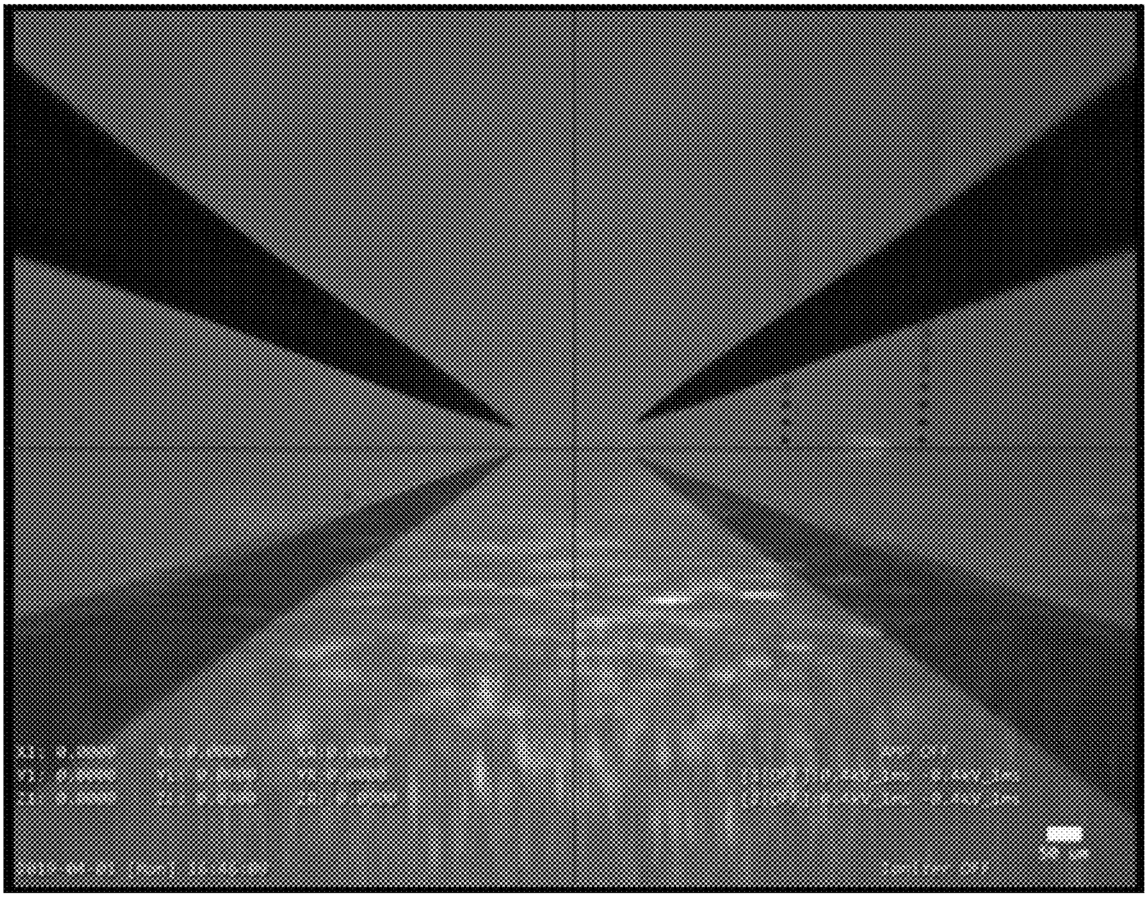
FIG. 5 is an image of a second camera image.

Of the attached drawings, FIG. 1 is a perspective view of a printing apparatus with a plurality of nozzle heads of the present disclosure, FIG. 2 is a front view of the printing apparatus with a plurality of nozzle heads of the present disclosure, FIG. 3 is a side view of the printing apparatus with a plurality of nozzle heads of the present disclosure, FIG. 4 is an image of a first camera image, and FIG. 5 is an image of a second camera image.

The printing apparatus with a plurality of nozzle heads of the present disclosure illustrated in the abovementioned drawings includes a first nozzle head 110, a second nozzle head 120, a first camera 130, a second camera 140 and a controller.

First, in the present embodiment, description is made with reference to an electrostatic jet printer that uses an electrohydrodynamic method for ultra-fine printing, but there is no limitation thereto, and thus the technical idea of the present disclosure may be applied to other types of printers that jet ink using nozzles as well. Further, in the present embodiment, a first axis is described as x axis, a second axis is described as y axis, and a third axis is described as z axis, but there is no limitation thereto.

The first nozzle head 110 includes a first nozzle tip for discharging ink onto a substrate at one section of a working area, a first moving part 112 for moving the first nozzle tip 111, and a first high voltage application part 113 for applying a high voltage to an electrode formed inside the first nozzle tip 111 in order to discharge ink in an electrohydrodynamic method.

The first nozzle tip 111 has inside thereof a chamber for accommodating ink, and discharges ink towards the substrate. Such a first nozzle tip 111 is disposed with an inclination with respect to a first axis so as to be observed in real time by means of the first camera 130 which photographs an image downwardly from above at the working area and the second camera 140 which is arranged near the working area and photographs an image in a downwardly inclined direction from above. Meanwhile, in the drawings of the present embodiment, the first nozzle tip 111 is illustrated as a cartridge type that is capable of being attached and detached so as to be replaced, but there is no limitation thereto.

The first moving part 112 is configured to be able to perform three-axis movements between the first nozzle tip 111 and a base, and the first moving part 112 may be configured to include a first axis linear drive mechanism, a second axis linear drive mechanism and a third axis linear drive mechanism. Such a configuration of the first moving part 112 is a well-known technology, and thus specific description thereof will be omitted. Meanwhile, in the present embodiment, it is described that the first moving part 112 has three degrees of freedom, but there is no limitation thereto. Modifications can be made in various forms when deemed necessary such as configuring the first moving part 112 to have six degrees of freedom for movements such as yaw, pitch, roll and the like.

The first nozzle tip 111 may be formed of a nozzle made of a conductive or non-conductive material of a capillary type widely used in electrostatic jet printers, and an outer diameter of the nozzle tip may be 1 to 300 μm, and an inner diameter of the nozzle tip may be 0.5 to 250 μm, and such an outer diameter and inner diameter of the nozzle tip may be changed according to needs such as the physical properties of the ink or the printing environment, etc. When the first high voltage application part 113 applies a high voltage to the electrode provided at the first nozzle tip 111 side, an electric field is formed between the electrode and the substrate. Here, polarities of the electrode and the substrate may be opposite to each other, or the substrate may be grounded. Due to the high voltage applied to the electrode, the electric field is formed in a direction from the electrode towards the substrate, and using the electrostatic force caused by the electric field, ink can be finely discharged. This printing principle of an electrostatic jet printer is a well-known technology, and thus detailed description thereof will be omitted.

The second nozzle head 120 includes a second nozzle tip 121 for discharging ink at the other section of the working area onto the substrate, a second moving part 122 for moving the second nozzle tip 121 and a second high voltage application part 123 for applying a high voltage to an electrode formed inside the second nozzle tip 121 in order to discharge ink in an electrohydrodynamic method.

The second nozzle tip 121, the second moving part 122 and the second high voltage application part 123 constituting such a second nozzle head 120 are made in the same form as the first nozzle tip 111, the first moving part 112 and the first high voltage application part 113 of the first nozzle head 110, and thus detailed description thereof will be omitted.

The first nozzle head 110 and the second nozzle head 120 are disposed to be spaced apart from each other in the first axis direction, and are disposed in a form symmetrical to the first nozzle head 110 with respect to the working area.

The first camera 130 is disposed above the substrate to photograph the working area in a vertically downward direction from above. When photographing the working area in an inclined direction, distortion of image may occur. However, by photographing the working area at a vertical location above the substrate, the process of the ink being adhered and the shape of the pattern being formed on the substrate by the adhesion of the ink can be obtained as images without distortion.

The second camera 140 is disposed near the working area to photograph the working area in an inclined direction from above. That is, the second camera 140 is disposed to be spaced apart from the first camera 130 in a second axis direction intersecting the first axis, and is disposed with an inclination with respect to the second axis. When the second camera 140 is disposed with an inclination as described above, through an image of the second camera 140, it is possible to see an image of the first nozzle tip 111 and an image of the second nozzle tip 121, and a mirroring image of the first nozzle tip 111 and a mirroring image of the second nozzle tip 121 reflected on the substrate at the same time.

The Field of View (FOV) of the first camera 130 and the second camera 140 are set to observe the first nozzle tip 111 and the second nozzle tip 121 within the working area at the same time. Here, the Field of View (FOV) refers to the size of a photographed image, that is, the range of an object that can be viewed by the camera when the camera photographed the object. For example, the FOV of the first camera 130 may be set to 425×454 μm while the FOV of the second camera 140 is set to 800×600 μm that is relatively greater than the FOV of the first camera 130. Accordingly, by focusing the image of the first nozzle tip 111 and the second nozzle tip 121 through the image of the first camera 130 in a state in which the position of the first nozzle tip 111 and the second nozzle tip 121 are recognized through the image of the second camera 140, it is possible to set the reference position P1 of the first nozzle tip 111 and the second nozzle 121.

Further, a Depth of Field (DOF) of the first camera 140 may be set to be not more than ±1.6 μm in order to set the reference position P1 of the first nozzle tip 111 and the second nozzle tip 121 precisely, and such a depth of the DOF area may be appropriately changed depending on the characteristics of the lens applied to the first camera 140. At the best focus position within the DOF area of the first camera 140 described above, the reference position P1 of the first nozzle tip 111 and the second nozzle tip 121 may be set. That is, once the first nozzle tip 111 and the second nozzle tip 121 are out of the DOF area of the first camera 130, since the image is blurred and the image contrast decreases, visualization and detection of the first nozzle tip 111 and the second nozzle tip 121 within the image of the first camera 130 becomes impossible. Accordingly, it is possible to find the best focus point by adjusting the position of the first nozzle tip 111 and the second nozzle tip 121 to the submicron level within the DOF area of the first camera 130, and set this best focus point as the reference position P1 of the first nozzle tip 111 and the second nozzle tip 121.

Further, the pixel resolution of the first camera 130 may be set to 0.1725 μm/pixel, and the pixel resolution of the second camera 140 may be set to 0.625 μm/pixel. That is, since the magnification of the first camera 130 is set to be higher than the second camera 140, the pixel resolution of the first camera 130 may be set to be relatively lower than the second camera 140.

The controller is configured to control the driving of the first moving part 112 and the second moving part 122 based on the image obtained in the first camera 130 and the second camera 140, and control each of the position of the first nozzle tip 111 and the position of the second nozzle tip 121. That is, the controller may receive the image obtained through the first camera 130 and the second camera 140, analyze the image of the first nozzle tip 111 and the second nozzle tip 121 displayed on the screen, and then provide the first moving part 112 and the second moving part 122 with driving signals for movement of the first nozzle tip 111 and the second nozzle tip 121.

Meanwhile, the first nozzle head 110, the second nozzle head 120, the first camera 130 and the second camera 140 may be installed on a support 150, and the support 150 may be configured to move in a third axis direction by a separate driving part (not illustrated). The printing apparatus with a plurality of nozzle heads of the present disclosure configured as described above can form a pattern on the substrate while simultaneously observing, through the image of the first camera 130 and the second camera 140, the first nozzle tip 111 and the second nozzle tip 121 that may each move independently, thereby improving the printing speed and productivity, and a compact configuration can be made by having the plurality of nozzles share a camera.

Next, a method for aligning a plurality of nozzle tips of the present disclosure will be described.

Figure 6:
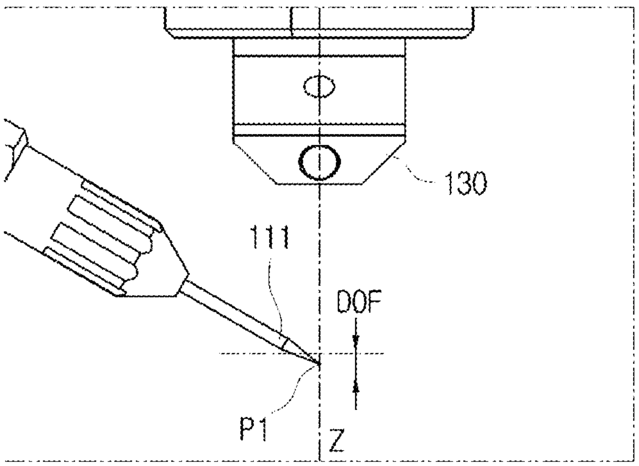
FIG. 6 is view of a first nozzle aligning step process.
Figure 7:
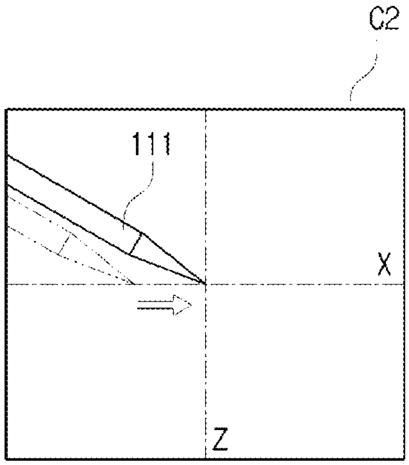
FIG. 7 is a view of the second camera image.
Figure 8:
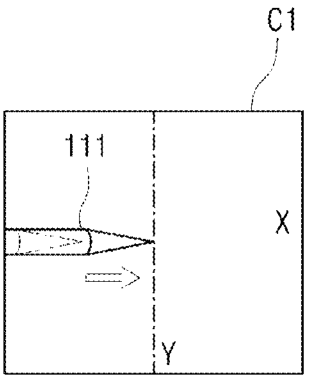
FIG. 8 is a view of the first camera image.
Figure 9:
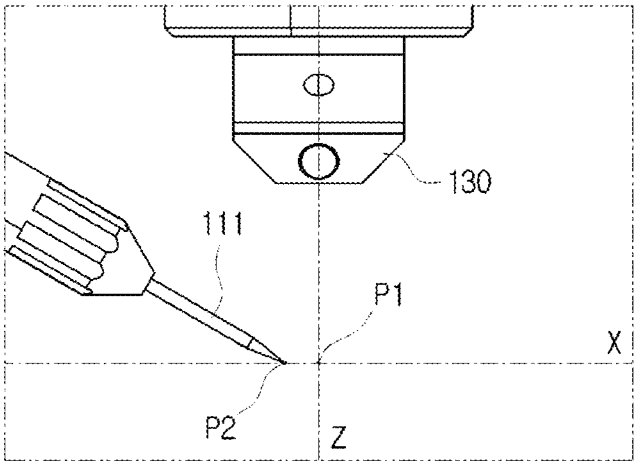
FIG. 9 is a view of a step of moving a first nozzle tip to a designated position after the first nozzle aligning step.
Figure 10:
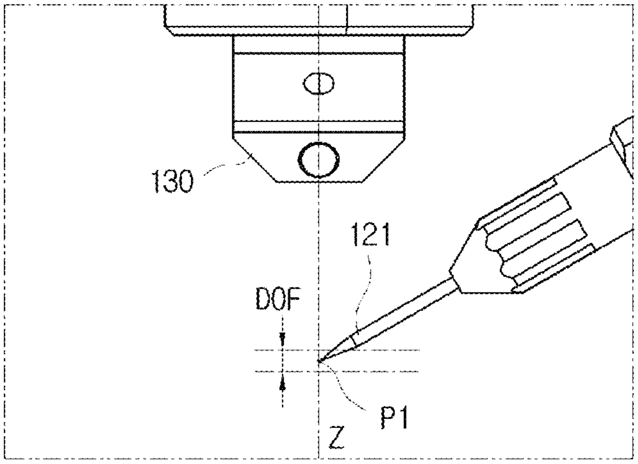
FIG. 10 is a view of a second nozzle aligning step process.
Figure 11:
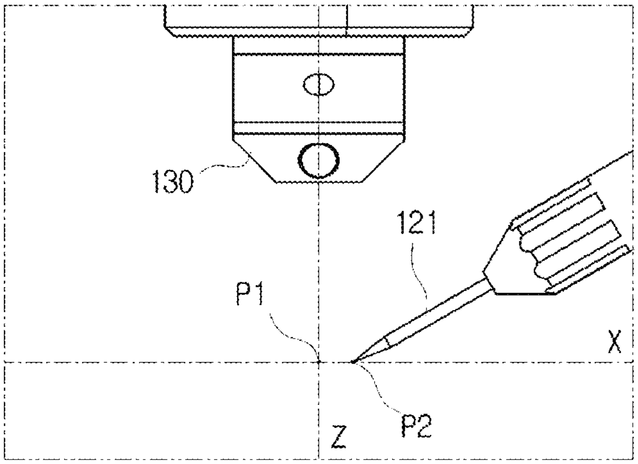
FIG. 11 is a view of a step of moving a second nozzle tip to a designated position after the second nozzle aligning step.
Figure 12:
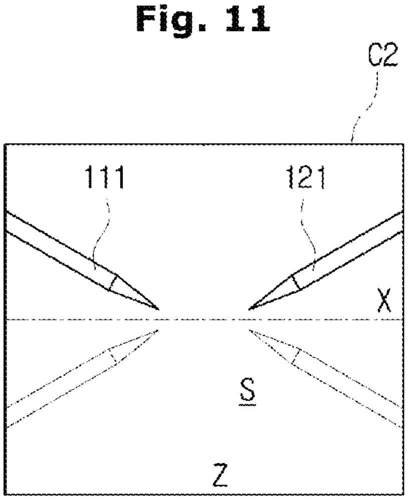
FIG. 12 is a view of a step of detecting a position of a substrate based on the second camera image.
Figure 13:
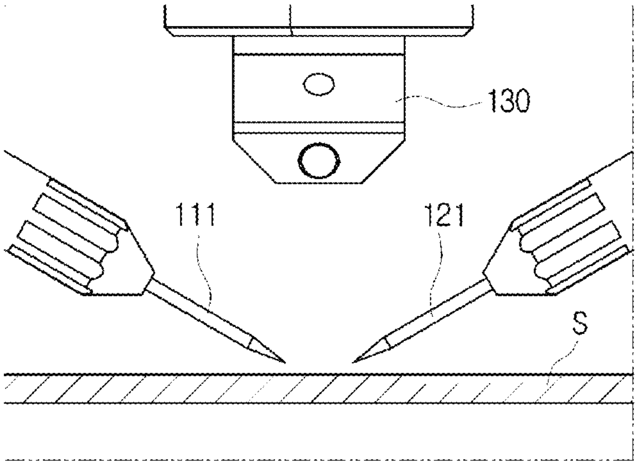
FIG. 13 is a view of a printing preparation step.

Of the attached drawings, FIG. 6 is view of a first nozzle aligning step process, FIG. 7 is a view of the second camera image, FIG. 8 is a view of the first camera image, FIG. 9 is a view of a step of moving a first nozzle tip to a designated position after the first nozzle aligning step, FIG. 10 is a view of a second nozzle aligning step process, FIG. 11 is a view of a step of moving a second nozzle tip to a designated position after the second nozzle aligning step, FIG. 12 is a view of a step of detecting a position of a substrate based on the second camera image, and FIG. 13 is a view of a printing preparation step.

The method for aligning a plurality of nozzle tips of the present disclosure includes a first nozzle aligning step (S110), a first nozzle moving step (S120), a second nozzle aligning step (S130), a second nozzle moving step (S140), a step of detecting a substrate position (S150) and a step of preparing printing (S160).

First, as illustrated in FIGS. 6 to 8, the first nozzle aligning step (S110) includes setting a reference position P1 (origin point in relative coordinates) of the first nozzle tip 111 for discharging ink within the working area using the first camera 130 that observes the working area from the above in a third axis Z direction of the working area and the second camera 140 that observes the working area from the above in a second axis Y direction of the working area.

First, as in FIG. 7, a first axis direction X, a second axis direction Y and a third axis direction Z position of the first nozzle tip 111 are adjusted such that a distal end of the first nozzle tip 111 is positioned at a center of the FOV of an image C2 of the second camera 140. Specifically, the position of the first nozzle tip 111 is adjusted such that the distal end of the first nozzle tip 111 is positioned at the center of the FOV of the image C2 of the second camera 140, and then the position of the first nozzle tip 111 is adjusted such that the distal end of the first nozzle tip 111 moves to the best focus position that is most clearly visible within the DOF area of the second camera 140.

Next, as in FIG. 8, the first axis direction X, the second axis direction Y and the third axis direction Z position of the first nozzle tip 111 are adjusted such that the distal end of the first nozzle tip 111 is positioned at a center of the FOV of the image C1 of the first camera 130, and as shown in FIG. 6, the position of the first nozzle tip 111 is adjusted such that the distal end of the first nozzle tip 111 moves to the best focus position that is most clearly visible within the DOF area of the first camera 130, and then the corresponding positions are set as the reference position P1 (relative coordinates origin point) of the first nozzle tip 111.

That is, by adjusting the first axis direction X, the second axis direction Y, and the third axis direction Z position of the first nozzle tip 111 to the center of the FOV of the image C2 and the best focus position of the second camera 140, and then adjusting the first axis direction X, the second axis direction Y, and the third axis direction Z position of the first nozzle tip 111 to the best focus position and the center of FOV in the image C2 of the first camera 130 that has a higher magnification compared to the second camera 140, it is possible to improve the precision of setting of the reference position P1.

Not only that, since the reference position P1 of the first nozzle tip 111 and the reference position of the second nozzle tip 121 are set respectively through the first camera 130 and the second camera 140 having fixed positions, the reference position P1 of the first nozzle tip 111 and the reference position P1 of the second nozzle tip 121 may be set as the same point.

Here, since the first camera 130 is in a fixed state where changing the posture is not possible, it is desirable to perform a process of aligning the center of the FOV of the image C2 of the second camera to the center of the image C1 of the first camera prior to setting the reference position P1.

As illustrated in FIG. 9, at the first nozzle moving step (S120), a position spaced apart by a certain distance in the first axis X direction from the reference position P1 set for the first nozzle tip 111 is set as the designated position P2, and then, in order to perform the second nozzle aligning step (S130), the first nozzle tip 111 is moved to a certain position far from the reference position P1.

As illustrated in FIG. 10, at second nozzle aligning step (S130), the first axis direction X position and the second axis direction Y position of the second nozzle tip 121 are adjusted such that the distal end of the second nozzle tip 121 is positioned at each of the center of the image C2 of the second camera 140 and the image C1 of the first camera 130, and then the third axis Z direction position of the second nozzle tip 121 is adjusted such that the distal end of the second nozzle tip 121 moves to the best focus position of the image C1 of the first camera 130, thereby setting the reference position P1 (relative coordinates origin point) of the second nozzle tip 121. This second nozzle aligning step (S130) consists of the same process as the first nozzle aligning step (S110), and thus detailed description is omitted.

Next, as illustrated in FIG. 11, at the second nozzle moving step (S140), a location spaced apart from the reference position P1 for the second nozzle tip 121 in the first axis X direction is set as the designated position P2. It is desirable that in order to inhibit interference of the first nozzle tip 111 and the second nozzle tip 121, the designated positions P2 are set to positions that are mutually spaced apart from the reference position P1 in the first axis X direction. After the designated position P2 of the second nozzle tip 121 is set, the second nozzle tip 121 may be moved to a certain position far away from the reference position P1 in order to position the substrate S on a stage.

Meanwhile, after seating the substrate S on the stage, the first nozzle tip 111 and the second nozzle tip 121 are moved to each of the designated positions P2, respectively.

Here, it desirable that the third axis Z direction position of the designated position P2 is set to be spaced apart from the substrate S in the third axis Z direction and at the same time the first nozzle tip and the second nozzle tip are positioned within the FOV of the image of the second camera such that the first nozzle tip 111 and the second nozzle tip 121 do not collide with the substrate S, and the third axis Z direction position of the first nozzle tip 111 and the second nozzle tip 121 are adjusted by the driving part that moves the support 150.

In the present embodiment, the first camera 130 can be used to autofocus the substrate S and identify the third axis Z direction position of the substrate S, and then the third axis Z direction position of the first nozzle tip 111 and the second nozzle tip 121 may be selected such that they are spaced apart from the substrate S by a predesignated distance.

Meanwhile, in the present embodiment, using the first camera 130 to autofocus the substrate S and detect the third axis direction position of the substrate S has been described as an example, but there is no limitation thereto, and thus it will also be possible to provide a separate autofocusing equipment that is based on laser or white LED for the autofocusing of the substrate S.

As illustrated in FIG. 12, at the step of detecting the position of the substrate (S150), it is possible to precisely detect the third axis Z direction position of the substrate S based on the image of the second camera 140.

Specifically, since the second camera 140 is installed to observe the working area from above at one side of the working area in a downward inclined direction, the image of the second camera 140 will show the images of the first nozzle tip 111 and the second nozzle tip 121 together with the mirroring images of the first nozzle tip 111 and the second nozzle tip 121 reflected on the substrate S.

Accordingly, the farther away the first nozzle tip 111 and the second nozzle tip 121 are from the substrate S, the greater the distance between the nozzle tip image and the mirroring image, and the closer the first nozzle tip 111 and the second nozzle tip 121 are from the substrate S, the closer the distance between the nozzle tip image and the mirroring image, and thus it is possible to analyze the image of the second camera 140 and detect the third axis Z direction position of the substrate S based on the designated position P2 of the first nozzle tip 111 and the second nozzle tip 121.

Thereafter, as illustrated in FIG. 13, at the printing preparation step (S160), using the driving part that moves the support 150, the first nozzle tip 111 and the second nozzle tip 121 may be positioned to a printing position on the substrate S, and then, by controlling the position of the first nozzle tip 111 and the second nozzle tip 121 according to a designated circuit pattern shape, the designated circuit pattern shape may be printed on the substrate S.

The scope of right of the present disclosure is not limited to the above-described embodiments, but may be implemented in various forms of embodiments within the scope of the appended claims set. Without departing from the gist of the present disclosure claimed in the claims set, it is considered to be within the scope of the claims of the present disclosure to various extents that can be modified by any person skilled in the art to which the invention pertains.

REFERENCE NUMERALS

110: FIRST NOZZLE HEAD, 111: FIRST NOZZLE TIP, 112: FIRST MOVING PART, 113: FIRST HIGH VOLTAGE APPLICATION PART, 120: SECOND NOZZLE HEAD, 121: SECOND NOZZLE TIP, 122: SECOND MOVING PART, 123: SECOND HIGH VOLTAGE APPLICATION PART, 130: FIRST CAMERA, 140: SECOND CAMERA, 150: SUPPORT, S: SUBSTRATE, P1: REFERENCE POSITION, P2: DESIGNATED POSITION

What is claimed is:

1. A method for aligning a plurality of nozzle tips, the method comprising:

a first nozzle aligning step of setting a reference position of a first nozzle tip for discharging ink within a working area through an image of a first camera observing the working area above a substrate and a second camera observing the working area in an inclined direction;

a second nozzle aligning step of setting a reference position of a second nozzle tip for discharging ink within the working area through the image of the first camera and the second camera;

a step of detecting a position of a substrate based on the image of the second camera; and a printing preparation step of positioning the first nozzle tip and the second nozzle tip to a printing position on the substrate, wherein after the first nozzle aligning step and the second nozzle aligning step, a step of moving the first nozzle tip and the second nozzle tip to designated positions is performed, wherein each designated position is spaced apart by a certain distance from the reference position.

2. The method for aligning a plurality of nozzle tips, according to claim 1, wherein the reference position is set by positioning a distal end of the first nozzle tip or a distal end of the second nozzle tip at a center of a Field of View (FOV) of the first camera, and then by positioning the distal end of the first nozzle tip or the distal end of the second nozzle tip at a center of a FOV of the second camera.

3. The method for aligning a plurality of nozzle tips, according to claim 1, wherein the step of detecting the position of the substrate comprises:

detecting a height of the substrate using an image of the nozzle tip included in the image obtained through the second camera and the mirroring image of the nozzle tip reflected on the substrate.

4. The method for aligning a plurality of nozzle tips, according to claim 1, wherein the designated positions are set such that the first nozzle tip and the second nozzle tip are spaced apart from each other in a horizontal direction with respect to the reference position so as to inhibit interference of the first nozzle tip and the second nozzle tip.

5. The method for aligning a plurality of nozzle tips, according to claim 4, wherein a third axis direction position of the designated position may be set as a position spaced apart by a predesignated distance from a position of the substrate detected by autofocusing the substrate.

6. The method for aligning a plurality of nozzle tips, according to claim 5, wherein at the step of moving to the designated position, the third axis direction position of the first nozzle tip and the second nozzle tip are adjusted by a driving part that moves the first nozzle tip, the second nozzle tip, the first camera, and the second camera at the same time.

7. The method for aligning a plurality of nozzle tips, according to claim 6, wherein at the printing preparation step, the third axis direction position of the first nozzle tip and the second nozzle tip are adjusted by the driving part that moves the first nozzle tip, the second nozzle tip, the first camera, and the second camera at the same time.

* * * * *